United States Patent Office

3,577,443
Patented May 4, 1971

---

3,577,443
SEPARATION OF OLEFINS FROM EPOXIDES
Thomas A. Washall, Wilmington, Del., and Sidney Blittman, Philadelphia, Pa., assignors to Atlantic Richfield Company, New York, N.Y.
No Drawing. Filed Nov. 12, 1968, Ser. No. 775,149
Int. Cl. C07d 1/12
U.S. Cl. 260—348                                    9 Claims

---

ABSTRACT OF THE DISCLOSURE $C_6$–$C_{18}$ olefins are separated from $C_6$–$C_{18}$ epoxides in mixtures wherein the boiling range of the epoxides overlaps the boiling range of the olefins utilizing a cyclic silica gel adsorption process.

---

BACKGROUND OF THE INVENTION

Field of the invention

This invention relates to a cyclic silica gel adsorption process for the separation of monoolefins having from 6 to 18 carbon atoms from epoxides having from 6 to 18 carbon atoms in mixtures wherein the boiling range of the epoxides overlaps the boiling range of the olefins.

Prior art

In recent years several processes have been developed for the epoxidation of monoolefins. One such method involves utilizing an organic hydroperoxide as the oxidizing agent and a molybdenum compound as the catalyst. When but a single olefin is epoxidized the olefin and its epoxide can be separated readily by ordinary distillation, but if a mixture of olefins, for example having a 3 or 4 carbon atom spread, is epoxidized the olefins and epoxides cannot be separated because of boiling point overlap.

This problem becomes particularly important with the higher molecular weight olefins since, in general, they are obtained as mixtures having a 3 or 4 carbon atom spread. For example, in one method of manufacture a mixture of straight chain paraffins are monochlorinated and the chlorinated paraffins are subsequently dehydrochlorinated to give the mixture of olefins. Since the starting material was a mixture, the olefins are obtained as a mixture. In another method a hydrocarbon wax fraction is cracked and there is obtained a mixture of olefins of at least a 3 to 4 carbon atom spread.

Moreover, separation by distillation is not feasible since it has been found that significant decomposition occurs when the higher molecular weight epoxides, e.g. $C_{14}$–$C_{18}$ epoxides are distilled even at pressures as low as 0.1 mm.

The present invention provides a simple and economical method for the separation of the epoxides made from such olefin mixture from the olefin mixture used to produce the epoxides.

SUMMARY OF THE INVENTION

In accordance with this invention olefins (i.e. monoolefins) having from 6 to 18 carbon atoms and the corresponding epoxides having from 6 to 18 carbon atoms are separated from each other when they are in mixtures wherein the boiling range of the olefins overlaps the boiling range of the epoxides by utilizing the difference in the adsorbabilities of olefins and epoxides on silica gel. In general, if the olefins and epoxides in the mixture have a 3–4 carbon atom spread the boiling ranges will overlap, e.g. $C_{15}$–$C_{18}$ olefins and $C_{15}$–$C_{18}$ epoxides will have overlapping boiling ranges. The mixture of olefins and epoxides is passed over a silica gel bed and when the bed can no longer adsorb the charge compounds the charge is stopped. The olefins are recovered by washing with a light hydrocarbon solvent such as normal pentane and the epoxides are recovered by washing with a polar solvent such as diethyl ether. The solvents are recovered by distillation and the silica gel bed is regenerated by washing with a light saturated hydrocarbon.

It is an object of this invention to provide a method for the separation of olefins from epoxides in mixtures wherein the boiling range of the epoxides overlaps the boiling range of the olefins.

It is another object of this invention to provide a method for the separation of olefins from epoxides in mixtures wherein the boiling range of the epoxides overlaps the boiling range of the olefins by the use of a continuous, cyclic silica gel adsorption method.

It is another object of this invention to provide a method for the separation of olefins from epoxides in mixtures wherein the boiling range of the epoxides overlaps the boiling range of the olefins by the use of a silica gel adsorption method wherein the silica gel can be regenerated by washing with a saturated hydrocarbon solvent.

Other objects of this invention will be apparent from the description of the preferred embodiments and from the claims.

DESCRIPTION OF THE PREFERRED EMBODIMENTS

Mixtures which are separable by the process of the instant invention can be either straight chain, branched-chain or cyclic monoolefins and epoxides. It is particularly applicable to olefins having from 6 to 18 carbon atoms in the molecule and epoxides having from 6 to 18 carbon atoms in the molecule. Examples are hexene-1; hexene-2; hexene-3; cyclohexene; heptene-1; heptene-2; heptene-3; the methylhexenes; the methylcyclohexenes; octene-1; octene-2; octene-3; octene-4; the ethylcyclohexenes; the methylheptenes; the nonenes; the decenes; the undecenes; the dodecenes; the tridecenes; the tetradecenes; the pentadecenes; the hexadecenes; the heptadecenes and the octadecenes, and the corresponding epoxides wherein the oxirane ring is formed by epoxidizing the olefinic double bond of the aforementioned olefins. Compounds wherein the hydrogens are substituted by other functional groups such as halogens, nitro groups and the like will have different adsorbabilities and therefore are not included.

As has been pointed out, it is possible to separate a single epoxide from a single olefin, for example, a $C_{14}$ alkyl epoxide from a $C_{14}$ monoolefin by simple distillation. When, however, mixtures of olefins and epoxides having a 3 to 4 carbon atom spread, for example, a $C_{14}$ to $C_{17}$ mixture of alkyl monoolefins and a $C_{14}$ to $C_{17}$ mixture of alkyl monoepoxides the boiling ranges of the epoxides and olefins will overlap and it is no longer possible to separate the epoxides from the olefins by simple distillation. In addition, it has been found that considerable decomposition of epoxides occurs in the higher molecular weight ranges when distillation is attempted. Accordingly, therefore, this invention is particularly applicable to the separation of mixtures of epoxides and mixtures of olefins wherein the boiling ranges overlap. In general, the boiling ranges will overlap if the carbon atom spread of the mixtures is in the 3-4 carbon range.

The separation of compounds in accordance with this invention depends upon the relatively large differences in the adsorbabilities produced by the presence of the olefinic double bond and the epoxide group. Consequently, the type of olefin or epoxide is not critical.

The silica gel employed is the ordinary commercial material manufactured for adsorption processes. In carrying out the separation the charge mixture containing the olefins and epoxides is charged to the silica gel bed which has been pre-wet with a saturated hydrocarbon solvent wherein the hydrocarbon contains from 5 to 8 carbon atoms, n-pentane is particularly preferred. Other suitable solvents include hexane, heptane, octane, cyclohexane and the like. Since it is generally desirable to separate the solvent from the olefins it is preferable to use a solvent which is separable by simple distillation.

After the charge has entered the gel bed additional amounts of the same saturated hydrocarbon preferably is added to push or wash the charge through the adsorbent bed. During the passage through the adsorbent bed the charge olefins migrate ahead of the epoxides since they are less strongly adsorbed. The quantity of charge to the silica gel bed is preferably not in excess of about 8-8.5 grams of epoxides per 100 grams of the gel. Thus, if a mixture of 50 weight percent olefins and 50 weight percent epoxides were to be separated the charge should not exceed about 16-17 grams per 100 grams of gel. If, however, the charge consisted of 90 weight percent olefins and 10 weight percent epoxides a charge of about 80 grams could be passed over the gel bed. After the passage of the charge into the bed the amount of saturated hydrocarbon solvent used for the wash which follows, as has been described, preferably ranges from about 3 to 4 milliliters of the saturated hydrocarbon per gram of the gel. In general, the amount should be sufficient to completely wash the olefins of the charge through the gel bed and thus amounts in excess of those mentioned can be used. The olefins in the saturated hydrocarbon solvent issues first from the bed but it is necessary to utilize a polar solvent to remove the epoxides.

The critical feature of the polar solvent used to remove the epoxides is that the solvent be sufficiently polar in order to displace the epoxide, but at the same time not be so strongly adsorbed that it cannot be removed subsequently by washing with the saturated hydrocarbon solvent. Polar solvents which are particularly suitable for the purpose of removing the epoxides from the bed and which are not so strongly adsorbed that the bed cannot be regenerated by washing with the saturated hydrocarbon solvent are the low molecular weight ethers, low molecular weight esters and chlorinated aromatics. The ethers which can be utilized are diethyl ether (the most preferred polar solvent), ethyl propyl ether, dipropyl ether, diisopropyl ether, di-n-butyl ether, di-n-amyl ether, and the like.

The esters which are suitable include ethyl acetate, propyl acetate, butyl acetate, amyl acetate, the ethyl ester of propionic acid, the ethyl ester of butyric acid and the like. The chlorinated aromatics which can be employed include ortho-, meta- and para-dichlorobenzene.

Following the removal of the olefins the epoxides are removed by washing the bed with an amount of polar solvent generally about equal to the amount of saturated hydrocarbon solvent used to wash out the olefins. The solvents are separated from the olefins and epoxides by ordinary distillation. In order to regenerate the bed following the removal of the epoxides the bed is again washed with 3 to 4 milliliters of saturated hydrocarbon solvent per gram of gel although as much as 6 ml. per gram of gel or more can be used to assure complete regeneration. The bed is left wet with the saturated hydrocarbon solvent and is ready for the next charge of the olefin-epoxide mixture.

Certain polar solvents which are effective for removal of epoxides from the bed, for example, propylene oxide, acetone, dioxane, tetrahydrofuran, methanol and others, were found to be too strongly adsorbed to be removed by simple washing with the saturated hydrocarbon solvent. Therefore the bed could not be regenerated except by first washing with a desired polar solvent such as diethyl ether and thereafter with the saturated hydrocarbon solvent. This procedure adds greatly to the cost of the process, obviously and therefore the aforementioned strongly polar solvents should not be used.

It is an important and novel feature of this invention that the method provides for the regeneration of the silica gel bed by simple washing with a non-polar saturated hydrocarbon solvent and does not require thermal regeneration as in prior art adsorption processes.

In general, the separation is carried out at room temperatures and pressures. Higher temperatures do not in general improve the separation and may, in fact, be slightly disadvantageous.

In the examples which follow, comparative runs are shown which illustrate the invention in greater detail and demonstrate its utility. It should be understood, however, that these data are not to be construed as limiting.

EXAMPLE I

In all of the runs which are set forth in this example and the following examples, the charge consisted of 10 grams of a mixture of which 50 weight percent was a mixture of $C_{14}$, $C_{16}$ and $C_{18}$ monoolefins and 50 weight percent of a mixture of $C_{15}$, $C_{16}$, $C_{17}$ and $C_{18}$ alkyl monoepoxides except in 3 runs 20 grams was used. The adsorbent bed was contained in a 24 inch by 1 inch diameter column and consisted of 100 grams of commercial silica gel of 100-200 mesh. The saturated hydrocarbon solvent was n-pentane (except as noted) and the polar solvent is noted in each run. The composition of the olefin fraction and the epoxide fraction after solvent stripping is given for each run. Except as otherwise noted, the silica gel bed was regenerated after each run by washing with 300 ml. of n-pentane. Runs 1 to 32, inclusive, were carried out on the same silica gel bed. All of the runs were carried out at room temperature, i.e. at about 72 to 75° F. except as noted. All analyses were made by gas chromatography.

It will be noted that the weight percent of each fraction based on the charge does not total 100 percent. This is due to loss which occurred during the solvent stripping operation which was done on a laboratory scale and thus small losses were magnified. It will also be noted that even when the preferred polar solvent was used to remove epoxides, the weight percent of the olefin fraction recovered exceeded the 50 weight percent of the charge. This resulted from the fact that the epoxide fraction which was combined with the olefin fraction to give the charge was contaminated with small amounts of olefins which olefins, after separation, appeared in the olefin fraction giving rise to a higher value than 50 percent based on the charge. It should also be noted, however, that in the second run with a polar solvent which is too strongly adsorbed to be removed by washing with the saturated hydrocarbon solvent (see runs 7, 12, 17 and 21 which follow in the table) the olefin fraction is unduly large and the epoxide fraction is unduly small because the capacity of the column has been exceeded and epoxide appeared in the olefin fraction.

| Run Number: | Fraction | Solvent | Weight percent [1] | Weight percent, O [2] | Weight percent, E [3] |
|---|---|---|---|---|---|
| 1 | Olefin | n-Pentane | 51.9 | 99+ | <1 |
|   | Epoxide | Diethyl ether | 46.4 | 2 | 98 |
| 2 | Olefin | n-Pentane | 52.1 | 99+ | <1 |
|   | Epoxide | Diethyl ether | 46.3 | 3 | 97 |
| 3 | Olefin | n-Pentane | 52.4 | 99+ | <1 |
|   | Epoxide | Diethyl ether | 46.2 | 2 | 98 |
| 4 | Olefin | n-Pentane | 52.6 | 99+ | <1 |
|   | Epoxide | Diethyl ether | 46.1 | 2 | 98 |
| 5 | Ooefin | n-Pentane | 52.4 | 99+ | <1 |
|   | Epoxide | Diethyl ether | 46.6 | 3 | 97 |
| 6 | Olefin | n-Pentane | 52.2 | 99+ | <1 |
|   | Epoxide | Acetone | 50.9 | 3 | 97 |
| 7 | Olefin | n-Pentane | 85.1 | 61 | 39 |
|   | Epoxide | Acetone | 14.2 | 3 | 97 |
| | | Column washed with 300 ml. diethyl ether and 300 ml. n-pentane | | | |
| 8 | Olefin | n-Pentane | 52.3 | 99+ | <1 |
|   | Epoxide | Ethyl acetate | 46.7 | 3 | 97 |
| 9 | Olefin | n-Pentane | 57.3 | 93 | 7 |
|   | Epoxide | Ethyl acetate | 41.1 | 2 | 98 |
| 10 | Olefin | n-Pentane | 52.4 | 99+ | <1 |
|    | Epoxide | Diethyl ether | 46.4 | 3 | 97 |
| 11 | Olefin | n-Pentane | 52.2 | 99+ | <1 |
|    | Epoxide | Dioxane | 49.7 | 3 | 97 |
| 12 | Olefin | n-Pentane | 79.1 | 66 | 34 |
|    | Epoxide | Dioxane | 20.3 | 3 | 97 |
| | | Column washed with 300 ml. diethyl ether and 300 ml. n-pentane | | | |
| 13 | Olefin | n-Pentane | 51.4 | 99+ | <1 |
|    | Epoxide | Di-n-butyl ether | 42.8 | 3 | 97 |
| 14 | Olefin | n-Pentane | 51.5 | 99+ | <1 |
|    | Epoxide | Di-n-butyl ether | 42.8 | 2 | 98 |
| 15 | Olefin | n-Pentane | 52.3 | 99+ | <1 |
|    | Epoxide | Diethyl ether | 46.0 | 3 | 97 |
| 16 | Olefin | n-Pentane | 52.1 | 99+ | <1 |
|    | Epoxide | Tetrahydrofuran | 51.1 | 3 | 97 |
| 17 | Olefin | n-Pentane | 62.7 | 86 | 14 |
|    | Epoxide | Tetrahydrofuran | 37.3 | 4 | 96 |
| | | Column washed with 300 ml. diethyl ether and 300 ml. n-pentane | | | |
| 18 | Olefin | n-Pentane | 52.2 | 99+ | <1 |
|    | Epoxide | Ethyl acetate | 46.6 | 4 | 96 |
| | | Column washed with 600 ml. instead of 300 ml. n-pentane to reactivate | | | |
| 19 | Olefin | n-Pentane | 55.1 | 95 | 5 |
|    | Epoxide | Ethyl acetate | 44.6 | 2 | 98 |
| 20 | Olefin | n-Pentane | 52.4 | 99+ | <1 |
|    | Epoxide | Propylene oxide | 47.9 | 3 | 97 |
| 21 | Olefin | n-Pentant | 56.7 | 93.6 | 6.4 |
|    | Epoxide | Propylene oxide | 43.2 | 3 | 97 |
| | | Column washed with 300 ml. diethyl ether and 300 ml. n-pentane | | | |
| 22 | Olefin | n-Pentane | 50.9 | 99+ | <1 |
|    | Epoxide | o-Dichlorobenzene | 26.5 | 1 | 99+ |
| 23 | Olefin | n-Pentane | 52.8 | 99+ | <1 |
|    | Epoxide | o-Dichlorobenzene | 27.0 | 3 | 97 |
| | | Column washed with 300 ml. diethyl ether and 300 ml. n-pentane | | | |
| 24 | Olefin | n-Pentane | 52.2 | 99+ | <1 |
|    | Epoxide | Isoamyl acetate | 46.5 | 3 | 97 |
| 25 | Olefin | n-Pentane | 54.1 | 99+ | <1 |
|    | Epoxide | Isoamyl acetate | 44.9 | 3 | 97 |
| | | Column washed with 300 ml. diethyl ether and 300 ml. n-pentane | | | |
| 26 | Olefin | n-Pentane | 52.3 | 99+ | <1 |
|    | Epoxide | Diethyl ether | 46.7 | 3 | 97 |
| 27 | Olefin | n-Pentane | 60.8 | 87.8 | 12.2 |
|    | Epoxide | Diethyl ether | 38.0 | 3 | 97 |
| | | Column washed with 300 ml. n-pentane | | | |
| 28 | Olefin | n-Pentane | 52.4 | 99+ | <1 |
|    | Epoxide | Methyl laurate | | | |
| 29 | Olefin | n-Pentane | | | <1 |
|    | Epoxide | Methyl laurate | | | |
| | | Column washed with 300 ml. diethyl ether and 300 ml. n-pentane | | | |
| 30 | Olefin | n-Pentane | 52.4 | 99+ | <1 |
|    | Epoxide | Diethyl ether | 48.2 | 3 | 97 |
| | | Column washed with 300 ml. n-pentane | | | |
| 31 | Olefin | n-Pentane | 52.2 | | |
|    | Epoxide | o-Dichlorobenzene | | | |
| 32 | Olefin | n-Pentane | 52.0 | | |
|    | Epoxide | o-Dichlorobenzene | | | |

[1] Weight percent based on charge.
[2] Weight percent olefin.
[3] Weight percent epoxide.

Runs 1 to 5 show the consistent efficiency of the separation utilizing the preferred solvents, i.e. n-pentane for removing olefins and diethyl ether for removing the epoxides. Also it will be seen that the column retains its efficiency.

In comparing runs 6 and 7 it will be seen that whereas acetone is effective for the removal of epoxides in run 6 it is so strongly adsorbed that the silica gel bed canot be completely regenerated using n-pentane and consequently in run 7 the capacity of the silica gel for adsorbing epoxides was exceeded as shown by the large amount of epoxides in the olefin fraction. As a result, the separation was completely inferior.

The column was regenerated after run 7 by washing with diethyl ether which removed the adsorbed acetone and then was regenerated in the usual manner with n-pentane.

Runs 8 and 9 show that ethyl acetate is suitable as a polar solvent. Run 10 shows that the column has retained its original efficiency when the preferred solvents are utilized.

Runs 11 and 12 are comparable to 6 and 7 and show that dioxane is too strongly adsorbed to be useful as a polar solvent. After run 12 the column was regenerated by removing the dioxane with diethyl ether and then washing with n-pentane as usual.

Runs 13 and 14 show the di-n-butyl ether is suitable as a polar solvent. Run 15 shows that the column still retains its original efficiency when preferred solvents are used.

Runs 16 and 17 are comparable to runs 6 and 7 and 11 and 12 and show that tetrahydrofuran is not a suitable polar solvent. The column was again washed with diethyl ether and n-pentane.

Runs 18 and 19 are a repeat of runs 8 and 9 except that 600 ml. of n-pentane were used to regenerate the silica gel after run 18 instead of the 300 ml. used between runs 8 and 9. Use of the larger volume of saturated solvent resulting in only a slight improvement in the separation efficiency.

Runs 20 and 21 show that propylene oxide is not suitable as a polar solvent although it is more desirable than some of the other more highly polar solvents. It was necessary to wash the column after run 21 with a combination of diethyl ether and n-pentane. Runs 22 and 23 show that ortho-dichlorobenzene is a suitable solvent, however, there was a considerable yield loss in the epoxide fraction mostly due to evaporation losses during recovery of the epoxide fraction. Runs 24 and 25 show isoamyl acetate can be utilized as a polar solvent.

Run 26 shows that the column has still retained its efficiency when utilizing the preferred solvents.

In run 27, a 20 gram charge was employed instead of the usual 10 grams. The data show that the olefin fraction contained 12.2 percent epoxide when a 20 gram charge was employed and thus the capacity of the column was calculated to be 8.5 grams of epoxide per 100 grams of silica gel per cycle.

This run was compared with run No. 33 wherein a new column of silica gel was prepared identical to the first column. A 20 gram mixture of the same charge mixture of olefins and epoxides was passed over the column instead of the usual 10 gram charge. In this run all of the epoxides were adsorbed and the column capacity was not reached.

In run 34 another new column of silica gel was prepared identical to the previous two columns but this column was prewashed with n-pentane, diethyl ether and n-pentane (300 ml. each) in that order. The results obtained in this run when separating a 20 gram portion of the olefin-epoxide mixture showed that the column capacity had been exceeded. Since this portion was separated using the normal operating procedure the capacity for a fresh column was found to be approximately 9.3 grams of epoxide per 100 grams of silica gel per cycle.

This run was compared with run 27 and it will be seen that the column which has been used for a large number of cycles (26) had decreased in capacity about 8.6 percent. This small decrease demonstrates that the column can be utilized over a very large number of cycles utilizing the preferred polar solvent to remove the epoxides and a saturated hydrocarbon solvent as the solvent of regeneration.

In runs 28 and 29 which followed run 27 on the used column, methyl laurate was utilized as the polar solvent but because of the difficulties involved in separating the methyl laurate from the resulting fractions it was not possible to determine the effectiveness of this high boiling ester. It was determined, however, that subsequent washing with n-pentane did not reactivate the silica gel but that it had to be reactivated by a combination of diethyl ether and n-pentane as in the case of other highly polar solvents.

Run 30 shows that the column had been regenerated and its efficiency retained.

EXAMPLE II

In two additional runs (31 and 32) a repeat experiment of runs 22 and 23 with ortho-dichlorobenzene was made except that the volume of desorbent employed was increased to 600 ml. from the 300 ml. volume normally employed. The results obtained showed that with the larger volumes the separations achieved in runs 31 and 32 were comparable to those obtained in runs 22 and 23.

EXAMPLE III

Two runs (35 and 36) were carried out on the silica gel bed of run 34 utilizing a temperature of 60° C. with methyl laurate as the polar solvent and isooctane as the saturated hydrocarbon solvent in an attempt to improve the removal of the polar solvent from the gel. Qualitative evaluation of the resulting fractions indicated no improvement in the separation and the silica gel could not be fully reactivated by washing with a saturated solvent.

EXAMPLE IV

Two further runs were made (37 and 38) which were a repeat of the ethyl acetate runs of Example I except that a temperature of 60° C. was employed. It was found in these runs that the higher temperature gave poorer results than was obtained at room temperature.

In general, results from runs at higher temperatures indicate that elevated temperatures are not required and do not improve the process.

When olefin and epoxide mixtures in the lower molecular weight range of the invention are separated as described for the $C_{14}$–$C_{18}$ mixtures, equally good results are obtained.

As many possible embodiments can be made of this invention without departing from the broad scope thereof, it is to be understood that all matter herein set forth is to be interpreted as illustrative and not as unduly limiting the invention.

We claim:

1. A method for the separation of monoolefins having from 6 to 18 carbon atoms in the molecule, from mono-epoxides having from 6 to 18 carbon atoms in the molecule and contained in mixtures wherein the boiling range of said olefins overlaps the boiling range of said epoxides, which comprises passing said mixture of said olefins and epoxides through a bed of silica gel adsorbent, followed by a saturated hydrocarbon solvent having from 5 to 8 carbon atoms in the molecule, collecting a solvent-olefin fraction, passing a polar solvent through said silica gel bed following passage of said saturated hydrocarbon solvent to remove said epoxides from said bed, collecting a polar solvent-epoxide fraction and recovering said olefins and epoxides from said respective fractions, said polar solvent being selected from the group consisting of the low molecular weight alkyl ethers having from 4 to 10 carbon atoms in the molecule, the low molecular weight esters of alkanols having from 2 to 4 atoms with saturated carboxylic acids having from 2 to 4 carbon atoms, and the isomeric dichlorobenzenes.

2. The method according to claim 1 wherein the mixture of said monoolefins has a range of from 3 to 4 carbon atoms and said mixture of monoepoxides has a range of from 3 to 4 carbon atoms.

3. The method according to claim 1 wherein said saturated hydrocarbon solvent is n-pentane.

4. The method according to claim 1 wherein the polar solvent is diethyl ether.

5. The method according to claim 1 wherein the polar solvent is di-n-butyl ether.

6. The method according to claim 1 wherein the polar solvent is ethyl acetate.

7. The method according to claim 1 wherein the polar solvent is ortho-dichlorobenzene.

8. The method according to claim 1 wherein said silica gel bed is regenerated following the removal of said epoxides from the bed by washing with said hydrocarbon solvent having from 5 to 8 carbon atoms.

9. The method according to claim 8 wherein said hydrocarbon solvent is n-pentane.

No references cited.

NORMA S. MILESTONE, Primary Examiner

U.S. Cl. X.R.

260—348.5